(12) United States Patent
Denzel et al.

(10) Patent No.: US 7,990,869 B2
(45) Date of Patent: Aug. 2, 2011

(54) METHOD FOR MONITORING DATA CONGESTION IN A COMPUTER NETWORK WITH MULTIPLE NODES AND METHOD FOR CONTROLLING DATA TRANSMISSION IN THE COMPUTER NETWORK

(75) Inventors: Wolfgang Emil Denzel, Langnau am Albis (CH); Andreas Christian Döring, Adliswil (CH); Maria Gabrani, Thalwil (CH); Mircea Gusat, Langnau (CH); Patricia Maria Sagmeister, Adliswil (CH); Thomas Schlipf, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 12/323,514

(22) Filed: Nov. 26, 2008

(65) Prior Publication Data

US 2009/0141630 A1 Jun. 4, 2009

(30) Foreign Application Priority Data

Nov. 30, 2007 (EP) .................................. 07121958

(51) Int. Cl.
*H04L 12/26* (2006.01)
*H04L 12/28* (2006.01)
(52) U.S. Cl. ........................................ 370/235; 370/412
(58) Field of Classification Search .................. 370/235, 370/232, 229–230, 252, 412, 332
See application file for complete search history.

(56) References Cited

U.S. PATENT DOCUMENTS

| | | | | |
|---|---|---|---|---|
| 5,751,969 | A | * | 5/1998 | Kapoor ........................... 709/235 |
| 5,838,677 | A | * | 11/1998 | Kozaki et al. .................. 370/389 |
| 5,982,751 | A | * | 11/1999 | Kim et al. ....................... 370/235 |
| 6,108,307 | A | * | 8/2000 | McConnell et al. ........... 370/235 |
| 7,418,002 | B2 | * | 8/2008 | Robotham et al. ............. 370/412 |
| 7,724,665 | B2 | * | 5/2010 | Tanaka ........................... 370/235 |
| 7,792,059 | B2 | * | 9/2010 | Fonseca et al. ................ 370/255 |
| 2005/0286416 | A1 | * | 12/2005 | Shimonishi et al. .......... 370/229 |
| 2006/0104298 | A1 | * | 5/2006 | McAlpine et al. ............ 370/412 |
| 2006/0203730 | A1 | * | 9/2006 | Zur ................................ 370/235 |
| 2006/0250962 | A1 | * | 11/2006 | Chikamatsu .................. 370/235 |
| 2007/0076598 | A1 | * | 4/2007 | Atkinson et al. .............. 370/229 |

OTHER PUBLICATIONS

InfiniBand Trade Association Web Site, http://www.infinibandta.org/home, Sep. 2, 2008.

* cited by examiner

*Primary Examiner* — Kwang B Yao
*Assistant Examiner* — Candal Elpenord
(74) *Attorney, Agent, or Firm* — Gail H. Zarick; Anne Vachon Dougherty

(57) ABSTRACT

A method for monitoring data congestion in a computer network with multiple nodes and for controlling data transmission in the computer network. The method includes generating a congestion notification by the node which detects a data congestion and transmitting the congestion notification to the data source which is involved in the data congestion. The method also includes generating in the data source a congestion value which indicates how severe the data congestion is, and storing in a worst case array of the data source those congestion values which indicate the most severe data congestions.

19 Claims, 4 Drawing Sheets

METHOD FOR MONITORING DATA CONGESTION IN A COMPUTER NETWORK WITH MULTIPLE NODES AND METHOD FOR CONTROLLING DATA TRANSMISSION IN THE COMPUTER NETWORK

CROSS-REFERENCE TO RELATED APPLICATIONS

This application claims priority under 35 U.S.C. §119 from European Patent Application No. 07121958.8 filed Nov. 30, 2007, the entire contents of which are incorporated herein by reference.

BACKGROUND OF THE INVENTION

1. Field of the Invention

The present invention relates to a method for monitoring data congestion in a computer network with multiple nodes, a method for controlling the data transmission in the computer network, and a computer network using the method for monitoring and controlling data congestion.

2. Description of Related Art

To be able to reap the benefits of the growth in computational power it is desired that the I/O subsystem of a computer is able to deliver the data requested by the processor subsystem at the rate at which it is desired. In recent years, it has become clear that the current shared bus-based architecture will become the bottleneck of the servers that host these powerful but demanding applications. InfiniBand™ is a solution to the corresponding limitation of the current I/O subsystem. The Infiniband specification defines the architecture of the interconnection that pulls together the I/O subsystems of the next generation of servers and will even move to the powerful desktop computers of the future. The architecture of the Infiniband is based on a serial, switched fabric and provides superior latency performance and products supporting 20 Gb/s node-to-node and 60 Gb/s switch-to-switch connections. Additionally, it resolves the scalability, expandability, and fault tolerance limitations of the shared bus architecture through the use of switches and routers in the construction of its fabric. Infiniband provides reliable end-to-end data connections and defines this capability to be implemented in hardware. In addition, Infiniband facilitates the deployment of virtualization solutions, which allow multiple applications to run on the same interconnect with dedicated application partitions. As a result, multiple applications run concurrently over stable connections, thereby minimizing downtime. Infiniband fabrics are typically constructed with multiple levels of redundancy in mind so if a link goes down, not only should the fault be limited to the link, but also an additional link can automatically be failed over to ensure that connectivity continues throughout the fabric. Creating multiple paths through the fabric results in intra-fabric redundancy and further contributes to the reliability of the fabric. Infiniband reference: http://www.infinibandta.org/home, Sep. 2, 2008.

SUMMARY OF THE INVENTION

An object of the invention is to provide a method for monitoring data congestion in a computer network, a method for controlling the data transmission in the computer network, a computer network using the method for monitoring and/or controlling data congestion, and a computer readable article of manufacture tangibly embodying computer readable instructions for executing the method.

According to one aspect of the invention, the object is achieved by a method for monitoring data congestion in a computer network with the features described. The method for monitoring data congestion in a computer network having multiple nodes and at least one data source includes the following steps: detecting the presence of a data congestion by a node; generating a congestion notification by the node which detects the data congestion in response to the detecting; transmitting the congestion notification to the data source; generating in the data source a congestion value for the data congestion where the value indicates the level of the data congestion; and storing at least one congestion value in a worst case array in a memory associated with the data source.

The level of the data congestion may in particular indicate how severe the data congestion is. A predetermined subset of the congestion values may include in particular those congestion values which indicate the most severe data congestions.

The method for controlling the data transmission in the computer network includes besides the above mentioned steps, the following step: the congestion value is used to enable the data transmission.

In the computer network with multiple nodes using the method for monitoring data congestion the nodes are designed such that they are able to generate a congestion notification, when a data congestion occurs.

Preferred embodiments of the invention arise from the characteristics indicated in the following. The method for monitoring data congestion in a computer network having multiple nodes includes the following steps: storing the congestion value in a first array in the memory when the data congestion has occurred in a data line; and storing the congestion value in a second array in the memory when the data congestion has occurred in a logical partition.

Furthermore, the method according to the invention can include the following step: increasing the congestion value, if within a timeout period a further congestion notification arrives.

Additionally, it can be provided in the method according to the invention that the congestion value is decreased, if within the timeout period no further congestion notification arrives.

In another embodiment of the method according to the invention the timeout period is increased, if within the timeout period a further congestion notification arrives.

In a further embodiment of the method according to the invention the timeout period is decreased, if within the timeout period no further congestion notification arrives.

Furthermore, the method according to the invention can include the following step: replacing the smallest congestion value in the worst case array by a new congestion value if the new congestion value is higher than the smallest congestion value.

In the method according to the invention a predetermined number of congestion values, for example, 16 congestion values, can be stored in the worst case array.

Additionally, it can be provided in the method according to the invention that the data transmission is enabled, if the congestion value drops below a threshold.

Advantageously, in the computer network the nodes have memory for storing the congestion values. Additionally, the nodes in the computer network can be provided with memory for storing timeout period values. Also, one or more nodes in the computer network can be a router.

Further, the invention includes a computer readable article of manufacture tangibly embodying computer readable instructions for executing a computer implemented method for monitoring data congestion in a computer network with multiple nodes and at least one data source.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

DETAILED DESCRIPTION OF THE PREFERRED EMBODIMENTS

The method according to the invention provides a computer or a virtual machine with information about how long it has to wait to get the permission for sending data via the network to a determined receiver.

Figure 1:
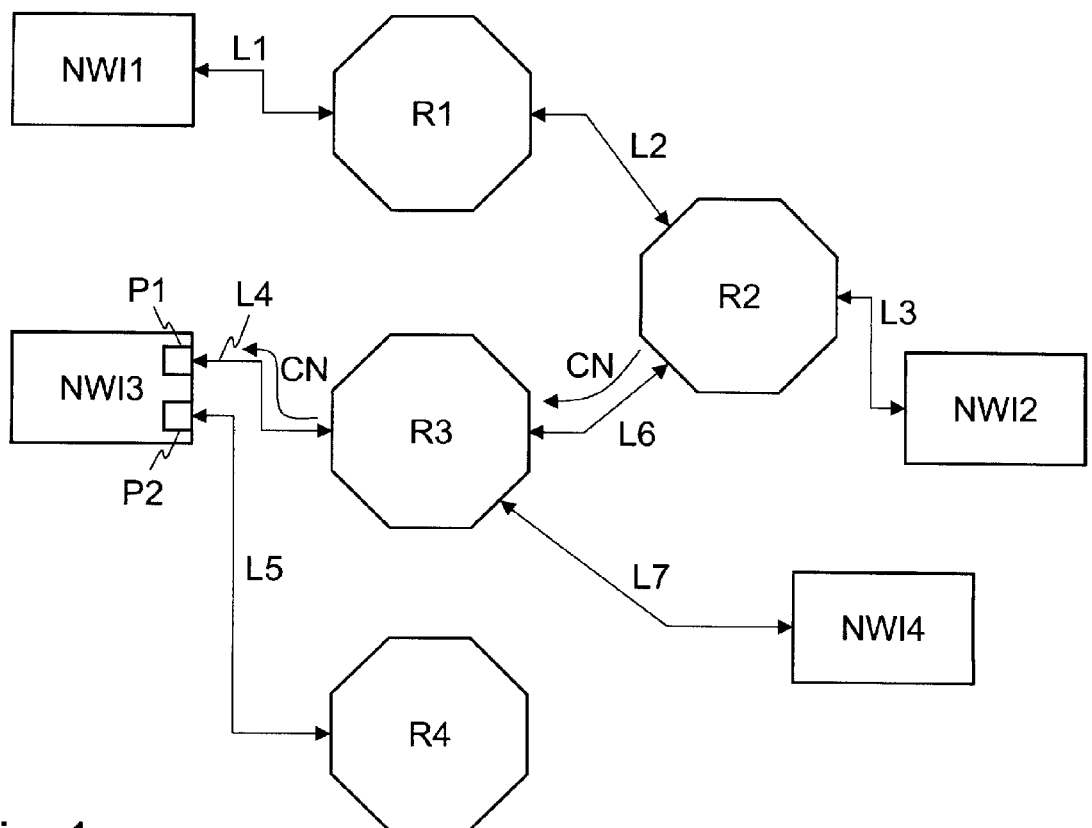
FIG. 1 is a block diagram of an example of an Infiniband network.

FIG. 1 shows a block diagram of an example of an Infiniband network. In order to be able to explain the function mode simply, a simple example was selected. The network comprises a first network interface NWI1, a second network interface NWI2, a third network interface NWI3, a fourth network interface NWI4, four routers R1 to R4 and communication lines L1 to L7. In the following the communication lines are also called physical communication lines, data lines or in short lines. In the example according to FIG. 1 only network interface NWI3 is depicted with ports P1 and P2, but in general, each of the network interfaces NWI1 to NWI4 may have two physical ports. With that network structure the redundancy and reliability can be increased.

Each of the network interfaces NWI1 to NWI4 can communicate with each other via the routers R1 to R4 and the communication lines L1 to L7. If for example, the network interface NWI1 is required to transmit data packets to the network interface NWI2, the data packets are transmitted from network interface NWI1 via communication line L1, router R1, communication line L2, router R2 and communication line L3 to the network interface NWI2. Also, if port P1 of network interface NWI3 is required to transmit data packets to the network interface NWI2, the data packets are transmitted from port P1 of network interface NWI3 via communication line L4, router R3, communication line L6, router R2 and communication line L3 to the network interface NWI2. In case both network interfaces NWI1 and NWI3 are required to transmit data packets at the same time to network interface NWI2 with high data rates and the communication line L3 is not designed to handle such a high data rate, a data congestion can appear at communication line L3. This congestion may lead to a data backlog on router R2, communication line L2, router R1, communication line L1, network interface NWI1, communication line L6, router R3, communication line L4 and network interface NWI3. The data backlog in router R3 can also lead to a congestion in a network interface which uses one of the components which are involved in the congestion. This can happen for example, if network interface NWI4 is required to transmit data packets via router R3.

A possibility for dissolving the data congestion on communication line L3 is to restrict the data stream or the data streams respectively, which are scheduled to be transmitted via communication line L3, so much that communication line L3 no longer forms the bottleneck for the data transfer. Therefore, router R2 can advise the data sources, that the network interfaces NWI1 and NWI3 are to reduce their transmission rate. In the following, the feedback from the unit which detects the data congestion to the data source or sources which are involved in the congestion, is called backward explicit congestion notification (BECN), or for short, congestion notification (CN).

Figure 2:
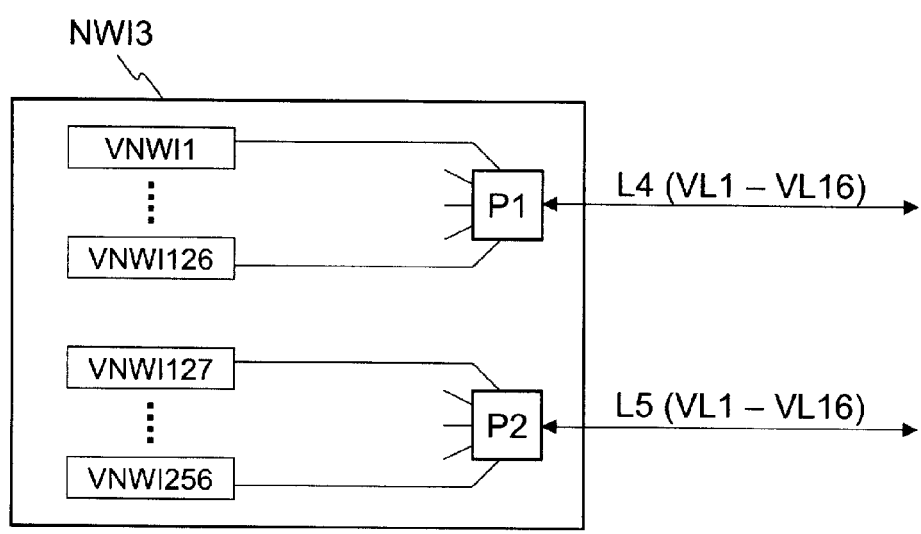
FIG. 2 is a block diagram of a network interface with a number of virtual network interfaces.

Virtualization:

Virtualization means that one physical computer can include, for example, 256 virtual machines, where on each of the virtual machines an independent application can run. With that, the workload of the physical computer can be increased. Furthermore, the staff can handle the system more easily, because there are fewer physical computers. The virtualization concerns also the network interfaces NW1 to NW4. This means, that one physical or real network interface can comprise for example 256 virtual network interfaces. For example, network interface NWI3 can comprise 256 virtual network interfaces VNWI1 to VNWI256 as it is depicted in the block diagram of FIG. 2. In the example of FIG. 2, the virtual network interfaces are also called logical network interfaces. Each of the virtual network interfaces is assigned a separate address and all virtual network interfaces are independent of another. This means, that the virtual machines are really independent from another. In the following, the virtual machines are also called virtual partitions or logical partitions LPAR.

In the example of FIG. 2, the first 128 virtual network interfaces VNWI1 to VNW128 are connected to the first physical port P1 and the second 128 virtual network interfaces VNWI129 to VNW256 are connected to the second physical port P2.

Each of the physical communication lines L1 to L7 of the network comprises several virtual lanes VL. For example the physical communication line L1 may comprise 16 virtual lanes VL1 to VL16. Each virtual lane VL1 to VL16 in turn can transmit a separate data stream, wherein the data streams are independent from another. This has the advantage, that although if one of the virtual data lanes is fully engaged, data traffic can take place on the remaining virtual data lanes.

As already mentioned, one network interface has 2 ports, and each port, i.e., each physical line, has 16 virtual lanes. This means that with 256 virtual machines, 2×16×256=8192 congestion management entries (CME) have to be handled. Each congestion management entry comprises a congestion memory with, for example, 40 bits storing a congestion value CV, which indicates the extent or level of the data congestion. In case a backward explicit congestion notification BECN occurs, the congestion value CV in the congestion memory is increased by one. After a certain timeout T the congestion value CV in the congestion memory is decreased by one, if no further backward explicit congestion notification BECN occurs within the timeout.

In the above example the entire congestion memory has a total size of 8192×40 bits=320 kbit or 40 kByte. Because of the high data rate the congestion memory should be embedded on the network interface chip rather than on a separate chip.

For downsizing the congestion memory, only the worst or most serious congestion is notified back to the data source or sources that are involved in the congestion by a backward explicit congestion notification BECN.

Figure 3:
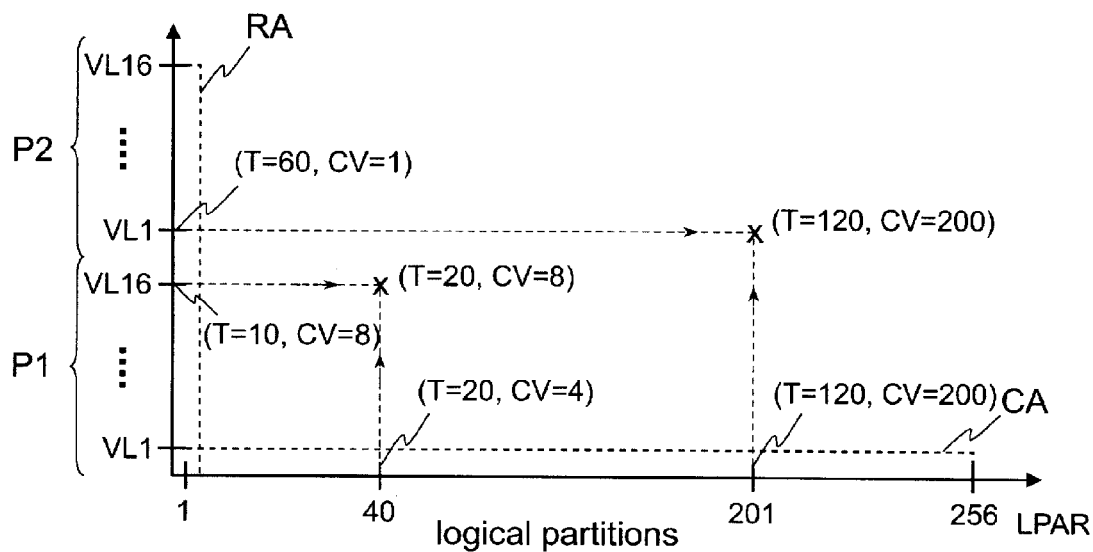
FIG. 3 is a row array and a column array for storing congestion values and timeout values.

Congestion Management:

As depicted in FIG. 3, a column array CA is provided, in which for each logical partition LPAR the corresponding timeout value or timeout period T and congestion value CV is stored. In the example of FIG. 3 it is stored in the column array CA that the logical partition LPAR 40 has a timeout T=20 and a congestion value CV=4. Whereas the logical partition LPAR 201 has a timeout T=120 and a congestion value CV=200.

The column array CA has the following semantic:

CA=[(LPAR1, T, CV), (LPAR2, T, CV), . . . (LPAR256, T, CV)]

In the example of FIG. 3 the column array CA has the following entries:

CA=[ . . . (40, 20, 4) . . . (201, 120, 200)]

Furthermore, as depicted in FIG. 3, a row array RA is provided, in which for each port P and each virtual lane VL the corresponding timeout T and congestion value CV is stored. In the example of FIG. 3 it is stored in the row array RA that the virtual lane VL16 of port P1 has a timeout T=10 and a congestion value CV=8. The virtual lane VL1 of port P2 however has a timeout T=60 and a congestion value CV=1.

The row array RA has the following semantic:

RA=[(P1VL1, T, CV), (P1VL2, T, CV), . . . (P1VL16, T, CV), (P2VL1, T, CV), (P2VL2, T, CV), . . . (P2VL16, T, CV)]

In the example of FIG. 3 the row array RA has the following entries:

RA=[ . . . (P1VL16, 10, 8) . . . (P2VL1, 60, 1) . . . ]

From the column array CA and the row array RA the worst 16 congestion entries are transferred to a worst case array WCA.

Figure 4:
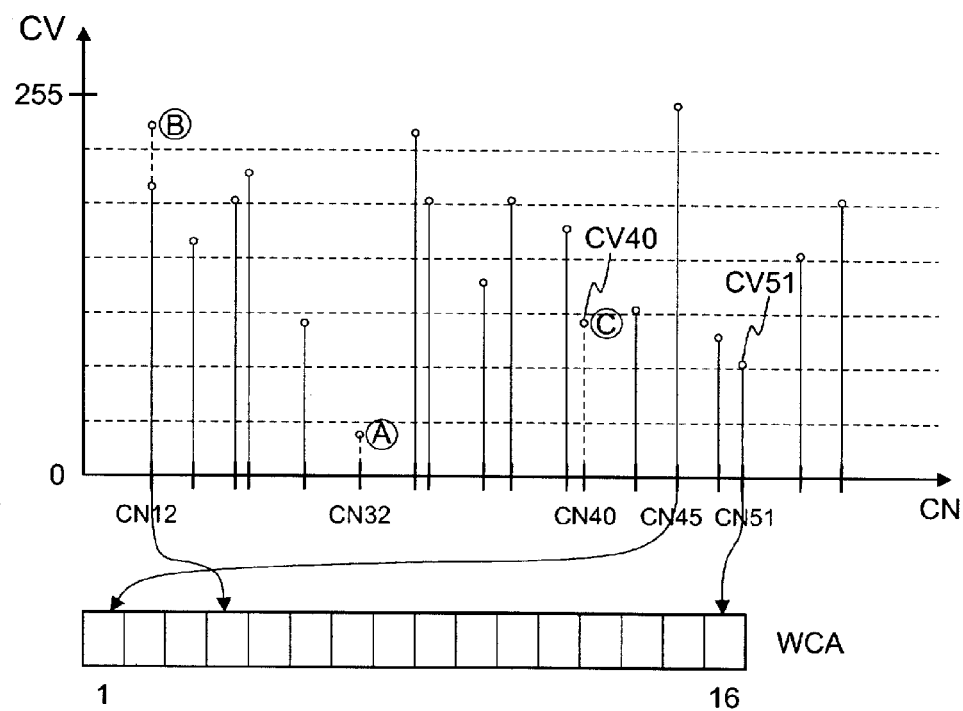
FIG. 4 is a diagram with congestion notifications and congestion values and the storage of those congestion values in a worst case array, which represent the most serious congestions.

The worst 16 congestion values are depicted in the diagram of FIG. 4.

Figure 5:
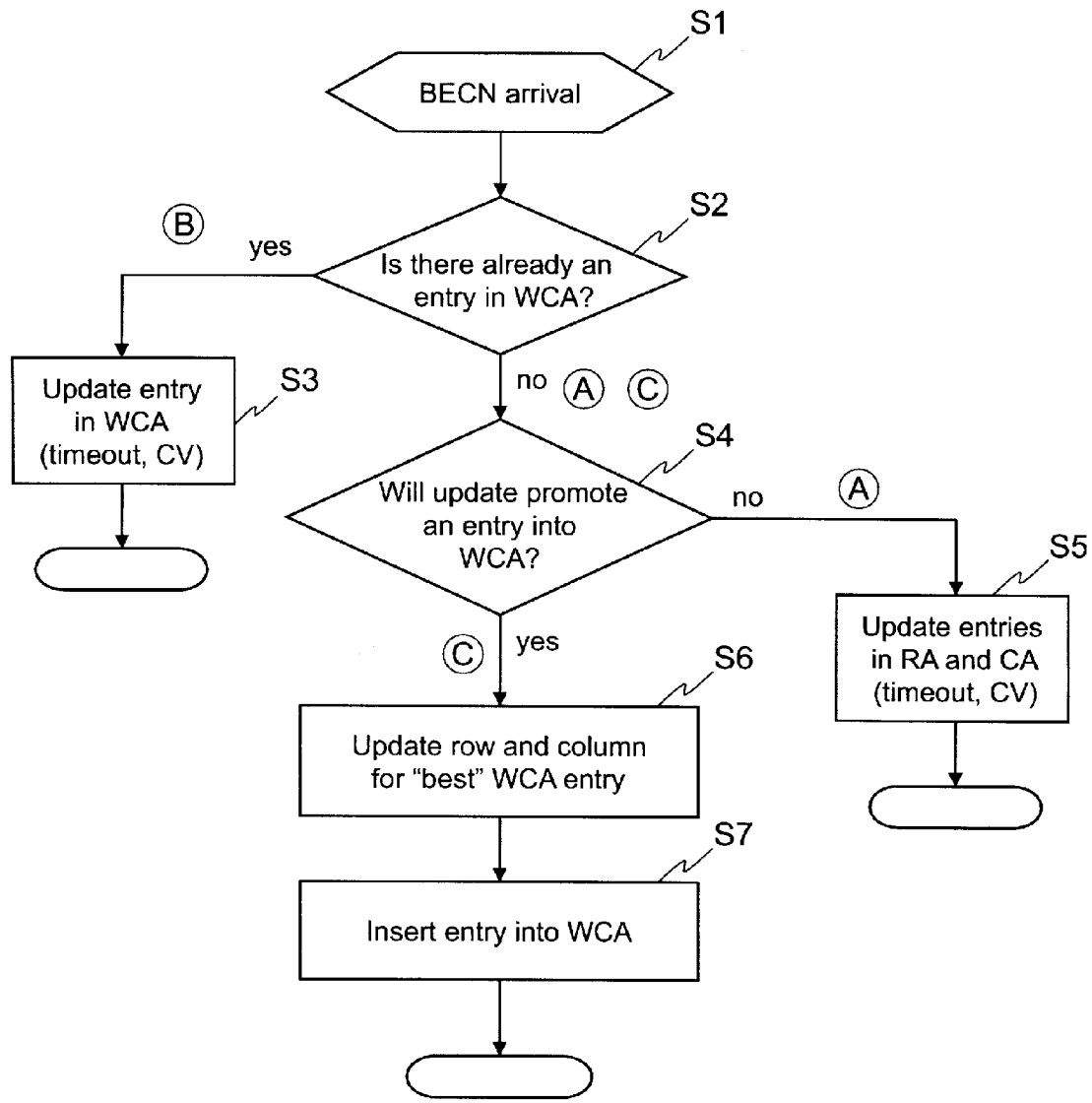
FIG. 5 is a flow diagram, which shows what happens, when a congestion notification arrives at a network node.

In the example of FIG. 4, it is explained by the flow diagram shown in FIG. 5 what happens if a new backward explicit congestion notification BECN arrives. If a new backward explicit congestion notification BECN arrives step S1 (S1), it is checked whether an entry already exists in the worst case array WCA step S2 (S2). If an entry exists in the worst case array WCA, this entry is updated in the worst case array WCA. If for example the entry CN11 is concerned, the congestion value CV is updated which is indicated in FIG. 4 by reference label B. Otherwise, it is checked in step S4, whether the update will promote a new entry into the worst case array WCA. If this is not the case, the entries (timeout T and congestion value CV) in the row array RA and the column array CA are updated in step S5. Otherwise, the entry in the worst case array WCA is updated in step S6 and the entry is inserted into the worst case array S7.

In the following it is described by means of three exemplary cases A, B and C what happens, if a new BECN arrives. FIG. 4, case A: A new backward explicit congestion notification BECN called congestion notification CN32 arrives. In step S2 it is checked, whether for the congestion notification CN32 an entry already exists in the worst case array WCA (S2). As there is no entry for the congestion notification CN32 in the worst case array WCA, step S4 is executed. Because the congestion value CV of the congestion notification CN32 is smaller than 16 other congestion values CV, the congestion value CV of the congestion notification CN32 will not be entered in the worst case array WCA. Therefore, step S5 is processed. The entries (timeout T, congestion value CV) in the row array RA and the column array CA will be updated.

FIG. 4, case B: A new backward explicit congestion notification BECN called congestion notification CN12 arrives. In step S2 it is checked, whether for the congestion notification CN12 an entry already exists in the worst case array WCA (S2). As there already an entry for the congestion notification CN12 in the worst case array WCA, step S3 is executed. The entry (timeout T, congestion value CV) worst case array WCA will be updated.

FIG. 4, case C: A new backward explicit congestion notification BECN called congestion notification CN40 arrives. In step S2 it is checked, whether for the congestion notification CN40 an entry already exists in the worst case array WCA (S2). As there is no entry for the congestion notification CN40 in the worst case array WCA, step S4 is executed. Because the congestion value CV of the congestion notification CN40 is higher than the smallest of the 16 highest congestion values CV, the congestion value CV of the congestion notification CN40 will be entered in the worst case array WCA. Therefore, step S6 is processed. The row and column for the best WCA entry will be updated, and in step S7 the entry (timeout T, congestion value CV) is inserted into the worst case array WCA.

Figure 6:
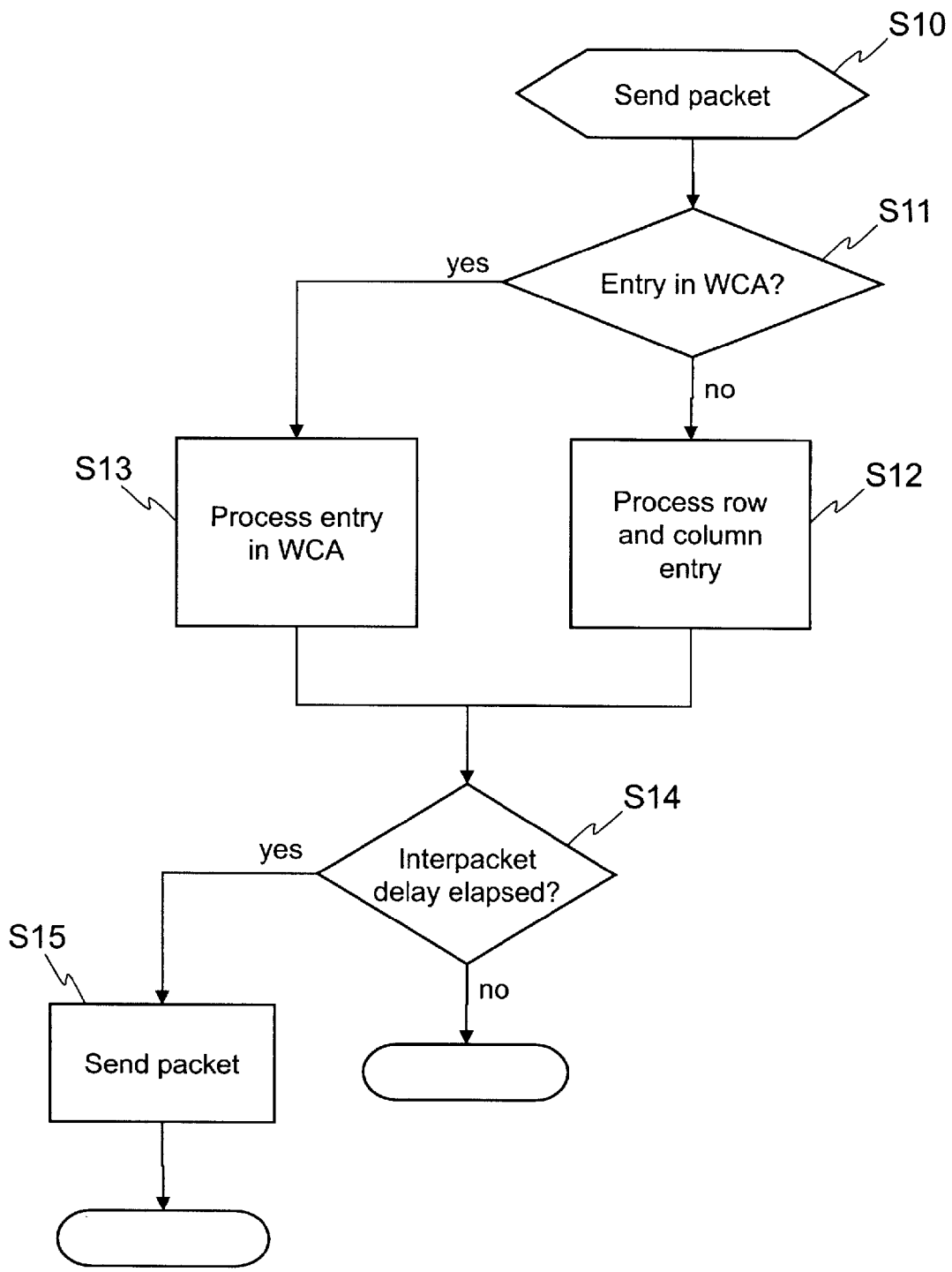
FIG. 6 is a flow diagram showing what happens, when a data packet is transmitted.

In the following it is explained by means of the flow diagram shown in FIG. 6 what happens if a data packet should be transmitted in the network step S10(S10). First, it is checked in step S11 whether there is an entry in the worst case array WCA. If this is not the case, the row and column entry is processed in step S12. Otherwise the entry in the worst case array WCA is processed in step S13. After performing steps S12 and S13 respectively, it is checked in step S14, whether the time delay is elapsed. If yes, the data packet is sent step S15(S15).

The method according to the invention can be used as a hypervisor, for instance, as a virtual machine monitor.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for monitoring data congestion in a computer network having multiple nodes and at least one data source, the method comprising: detecting the presence of a data congestion by a node; generating a congestion notification by the node which detected the data congestion in response to the detecting; transmitting the congestion notification to the data source; generating in the data source a congestion value for the data congestion, which value quantifies the level of the data congestion; comparing the generated congestion value to a plurality of stored congestion values stored in a worst case array in a memory associated with the data source, said stored congestion values comprising congestion values representing severe data congestion detected by nodes in the network; and storing said generated congestion value in the worst case array when the generated congestion value exceeds a previously-stored congestion value, wherein said data source controls data transmissions based on the congestion values stored in said worst case array.

2. The method according to claim 1, further comprising the steps of:

determining that the data congestion occurs in one of a data line and a logical partition;

in response to the step of determining that the data congestion has occurred in the data line, storing the congestion value in a first array in the memory; and in response to the step of determining that the data congestion has occurred in the logical partition, storing the congestion value in a second array in the memory.

3. The method according to claim 1, further comprising:
increasing the congestion value in response to a further congestion notification arriving within a timeout period.

4. The method according to claim 1, further comprising:
decreasing the congestion value in response to no further congestion notification arriving within a timeout period.

5. The method according to claim 3, further comprising:
increasing the timeout period in response to a further congestion notification arriving within the predetermined timeout period.

6. The method according claim 4, further comprising:
decreasing the timeout period in response to no further congestion notification arriving within the timeout period.

7. The method according to claim 1, further comprising:
storing a predetermined number of congestion values in the worst case array.

8. The method according to claim 1, further comprising:
controlling the data transmission by using the congestion value to enable the data transmission.

9. The method according to claim 8, further comprising:
enabling the data transmission, when the congestion value drops below a threshold.

10. A computer network having multiple nodes and at least one data source for monitoring data congestion, comprising:
at least one node for detecting a data congestion, generating a congestion notification, and transmitting the generated congestion notification; a data source for generating a congestion value which quantifies the level of the data congestion in response to the generated congestion notification, for comparing the generated congestion value to a plurality of stored congestion values stored in a worst case array in a memory associated with the data source, for storing said generated congestion value in the worst case array when the generated congestion value exceeds a previously-stored congestion value, and for controlling data transmissions based on the congestion values stored in said worst case array; and the worst case array in the memory associated with the data source for storing the plurality of stored congestion values, said stored congestion values comprising congestion values representing severe data congestion detected by nodes in the network.

11. The computer network according to claim 10, wherein the congestion values are stored in a memory in a node.

12. The computer network according to claim 11, wherein timeout values for each stored congestion value are stored in a memory in a node.

13. The computer network according to claim 10, wherein at least one of the nodes is a router.

14. A non-transitory computer readable article of manufacture tangibly embodying computer readable instructions for executing a computer implemented method for monitoring data congestion in a computer network having multiple nodes and at least one data source, the method comprising the steps of: detecting the presence of a data congestion by a node; generating a congestion notification by the node which detected the data congestion in response to the detecting; transmitting the generated congestion notification to the data source; generating in the data source a congestion value for the data congestion, which value quantifies the level of the data congestion; comparing the generated congestion value to a plurality of stored congestion values stored in a worst case array in a memory associated with the data source, said stored congestion values comprising congestion values representing severe data congestion detected by nodes in the network; and storing said generated congestion value in the worst case array when the generated congestion value exceeds a previously-stored congestion value, and wherein said data source controls data transmissions based on the congestion values stored in said worst case array.

15. The non-transitory computer readable article of manufacture according to claim 14, further comprising the steps of:
determining that the data congestion occurs in one of a data line and a logical partition;

in response to the step of determining that the data congestion has occurred in the data line, storing the congestion value in a first array in the memory; and in response to the step of determining that the data congestion has occurred in the logical partition, storing the congestion value in a second array in the memory.

16. The non-transitory computer readable article of manufacture according to claim 14, further comprising:
increasing the congestion value in response to a further congestion notification arriving within a timeout period.

17. The non-transitory computer readable article of manufacture according to claim 14, further comprising:
decreasing the congestion value in response to no further congestion notification arriving within a timeout period.

18. The non-transitory computer readable article of manufacture according to claim 14, further comprising:
controlling the data transmission by using the congestion value to enable the data transmission.

19. The non-transitory computer readable article of manufacture according to claim 18, further comprising:
enabling the data transmission, when the congestion value drops below a threshold.

* * * * *